United States Patent
Casmero

Patent Number: 6,011,219
Date of Patent: Jan. 4, 2000

[54] AERIAL RAT GUARD

[76] Inventor: Jacqueline M. Casmero, 4211 Division St., Los Angeles, Calif. 90065-4261

[21] Appl. No.: 08/974,713

[22] Filed: Nov. 19, 1997

[51] Int. Cl.[7] ............... H02G 3/00; H01B 7/00
[52] U.S. Cl. ............ 174/40 R; 174/5 R; 174/138 R; 114/221 R
[58] Field of Search ............ 174/40 R, 135, 174/138 R, 42, 5 R; 114/221 R

[56] References Cited

U.S. PATENT DOCUMENTS

| | | |
|---|---|---|
| 1,376,202 | 4/1921 | Hart . |
| 1,709,225 | 4/1929 | Mead .................... 114/221 R |
| 1,744,834 | 1/1930 | Maynard . |
| 2,483,874 | 10/1949 | Bernard . |
| 2,617,378 | 11/1952 | Osol ..................... 114/221 R |
| 2,959,147 | 11/1960 | Reubenstine . |
| 3,753,416 | 8/1973 | Haglund et al. . |
| 4,570,564 | 2/1986 | Salvarezza . |
| 4,782,622 | 11/1988 | Roberts ..................... 43/131 |
| 5,184,415 | 2/1993 | Hattenbach et al. ........... 43/58 |
| 5,570,652 | 11/1996 | Ferland .................. 114/221 R |

*Primary Examiner*—Kristine Kincaid
*Assistant Examiner*—Mark Olds

[57] ABSTRACT

An aerial rat/rodent guard for residential/commercial utility wires and cables and the like. A barrier plate manufactured from lightweight, non-conductive, smooth surfaced materials molded into a tear drop shaped plate. The center slot is located above the center of gravity allowing the plate's upright position. Removable grommets in the center slot provides the size of the center slot to be adjusted to the size of the utility wire upon which it hangs. A slit opening from the center slot downward to the bottom of the plate provides easy installation. Weight molded into the bottom quarter of the barrier plate allows the barrier plate to return to an upright position if tampered with by a rat/rodent. With the slit closed, a tail clip is attached to the bottom of the barrier plate which locks the slit in a closed position. Once mounted on the wires or cables, without the necessity of tools, the aerial rat/rodent guard does not need to be removed.

15 Claims, 2 Drawing Sheets

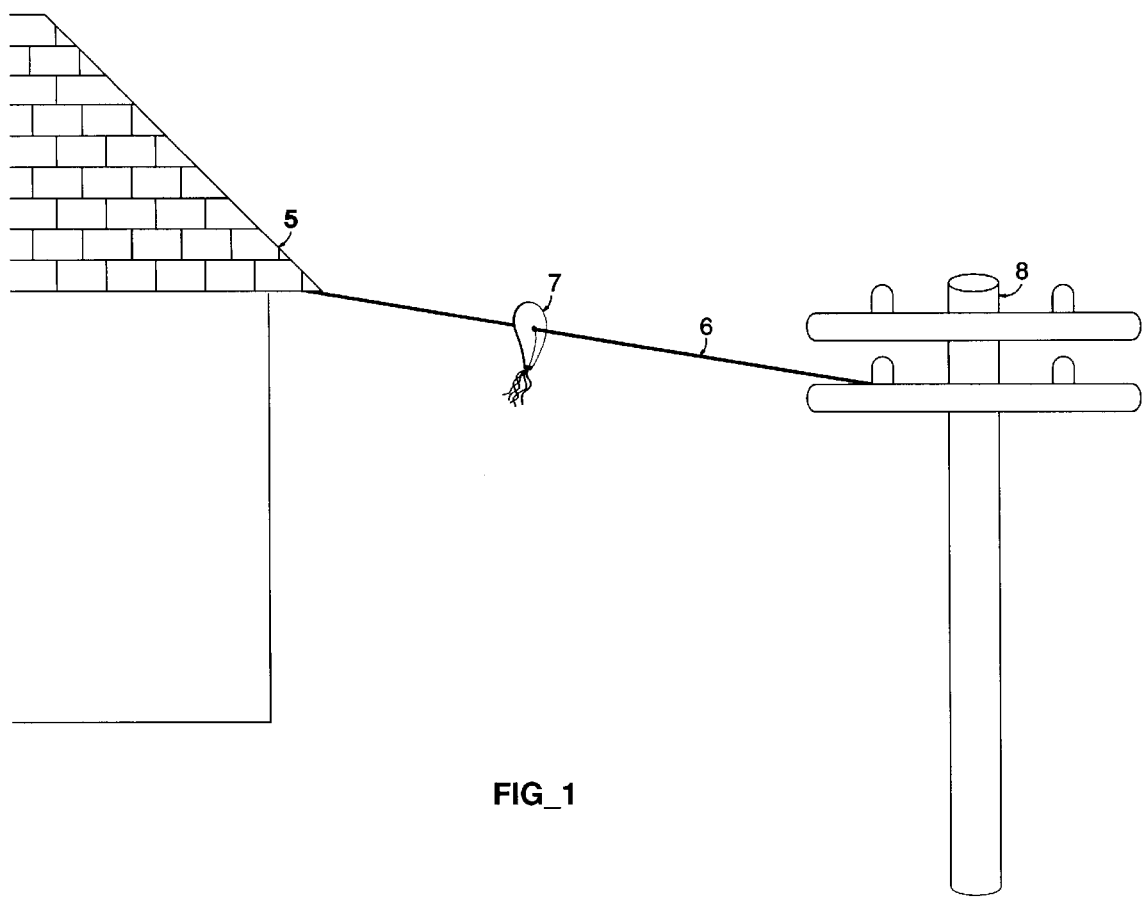
FIG_1
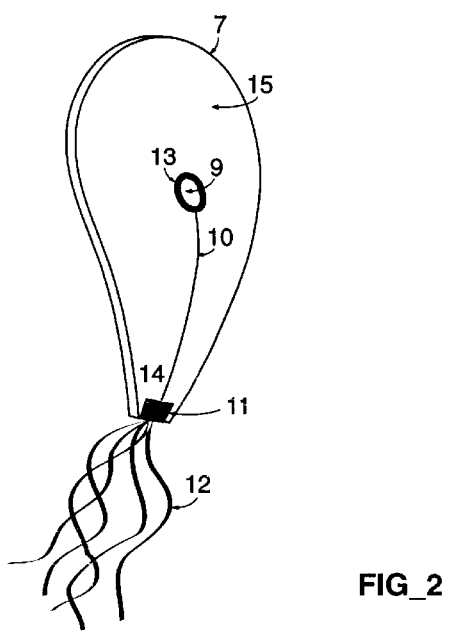
FIG_2

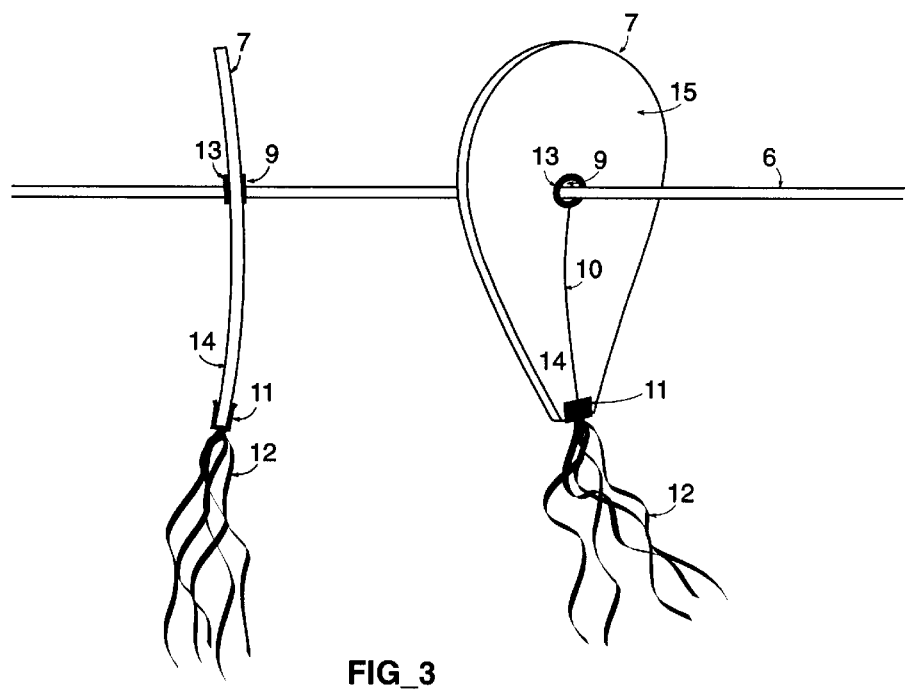
FIG_3
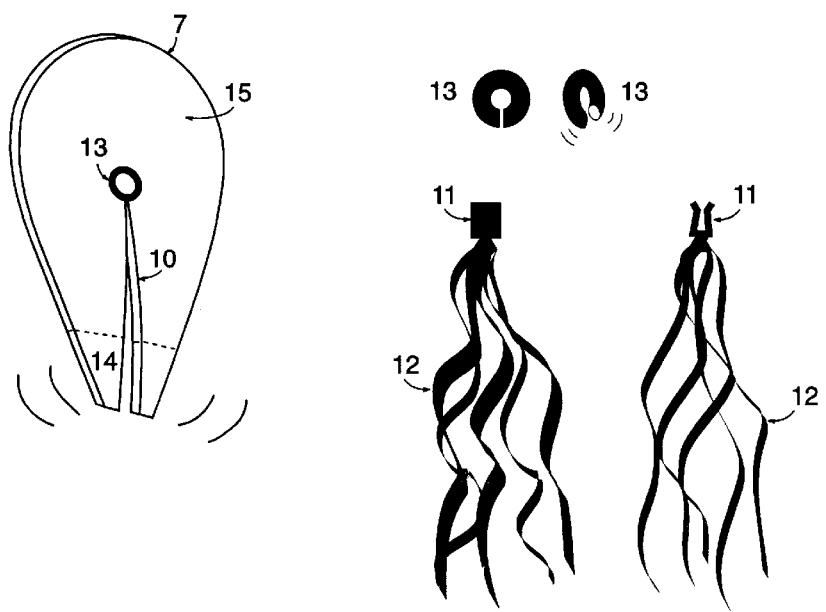
FIG_4

AERIAL RAT GUARD

BACKGROUND OF THE INVENTION

1. Field of the Invention

The present invention relates to an improved rat/rodent guard adapted for use on wires and cables commonly used in residential structures. The present invention encompasses a simplified method of installation, manufacture and design and safety configured for the residential home consumer in mind.

2. Description of Related Art

It has been well known that rat/rodent guards are widely used on ships. Improvements over prior guards have evolved with the disadvantage that the designs still caters primarily for use in connection with ships or the design too heavy for residential wires and cable sizes or contain metal parts or require the use of tools to mount the rat/rodent guard, in addition to not aesthetically configured for a residential environment. The present invention encompasses a design that overcomes the problems with prior art.

Generally, a rat/rodent guard is mounted upon wires or cables to establish a barrier between a structure and the rat/rodent's accessibility to that structure. The present invention basic concept is that the design embody shape and weight into a one-piece plate which locks closed with a tail clip to create an unstable barrier plate intended to move when tampered by a rat/rodent. It is also designed to be mounted without the use of tools which can cause significant safety problems if consumers use tools during installation on utility wires or cables. This improvement over prior art creates a simplified design and safety feature necessary for residential home consumer users. In addition, the new improved rat/rodent guard overcomes the need for metal parts or screws, excessive parts and use of pesticides and addresses aesthetic concerns of a residential environment.

This invention relates to a new application, design and use of an aerial rat/rodent guard which is used on residential dwellings and building structures to prevent rats from accessing the roof, attics and the like via consumer's utility wires and cables extending from telephone poles to the consumer's roof of their dwellings or commercial structures. By the nature of its light weight smooth surfaced material, tear drop shape and convexo-concaved plate enhances its principal design feature and nature in that it remains in an upright position and returns to place if tampered with by the rat/rodent; becomes unstable and unmanageable by tipping and swinging from side to side where the rat is unable to push down, jump nor gain any traction on the guard. The aerial rat/rodent guard's light weight construction does not create a drag on utility wires and cables and is not conductive of electricity.

Installation is simple for consumers and without the use of tools and removal of the aerial rat/rodent guard is not necessary. Modifications to the design and enhancements to the basic concept and basic components would not deviate from the spirit and mechanics of this invention.

BRIEF SUMMARY OF THE INVENTION

The object of the present invention is to provide a new and improved rat/rodent guard that is effective, inexpensive to manufacture, contain fewer parts, simple to install and encompasses safety features designed for residential home user in mind. An aerial rat/rodent guard of this invention is preferably a tear drop shaped barrier plate constructed from light weight, smooth surfaced, non-conductive materials.

Whether tear drop shaped and slightly convexo-concaved, the aerial rat/rodent guard is characterized by easy installation, tools are not required and the guard does not have to be removed. The barrier plate has a center slot located above the center of gravity and has a vertical slit which extends from the center slot to the bottom of the aerial barrier plate. With the slit open, the aerial rat/rodent guard slides over the wire to the center slot and the slit is closed by the design and a bottom tail clip is attached locking the guard closed. Adding to the tail clip streamers adds an aesthetic configuration for a residential environment. The tear drop shaped barrier plate has a slot above the center of gravity to maintain an upright position and the weighted tail section gives the barrier plate the ability to tip and swing from side to side and to be unstable if tampered by a rat/rodent. The guard is constructed wherein the weight molded at the bottom of the barrier plate allows the guard to always return to an upright position if tampered by a rat/rodent. This shape and weight distributed to the bottom of the barrier plate also causes resistance and does not allow the rat to push down the guard. The smooth surface does not allow the rat to gain any traction if he were to try to climb the guard. The guard has an aerodynamic shape consisting of light weight material in order to not put a drag on the utility/cable wires. The center slot is adjustable with removable grommets in order for the guard to affix to the different sizes of utility wires and to protect utility wire casings from fraying. The grommets also prevent the guard from creeping up or down the utility lines. The aerial rat/rodent guard is aesthetically configured for residential and commercial use.

BRIEF DESCRIPTION OF THE DRAWINGS

FIG. 1 is a view in perspective of a telephone pole with utility wires running from the pole to the roof of a dwelling/structure with the aerial rat/rodent guard embodying the principles of the invention located approximately 6 feet from the edge of the roof of a dwelling/structure.

FIG. 2 is a view of the front perspective of the aerial rat/rodent guard embodying the principles of the invention in its design and material surfaces.

FIG. 3 is a side view and a modified frontal view of the aerial rat/rodent guard showing the aerodynamic design and the slightly convexo-concaved plate and the guard's relation to the utility wires and upright nature.

FIG. 4 is a view of the back-side of the aerial rat/rodent guard embodying the principles of its one time installation; its upright position, and embodiments of the weight at the tail of the aerial rat/rodent guard and a view of the center adjustable slot with a removable center grommet to adjust the center slot smaller for smaller sized cables and wires; and the center slit opened for purposes of installation; and, the tail clip which encompasses the means for locking the bottom of the guard in addition to adding the streamers to said clip for aesthetic configuration.

DESCRIPTION OF A PREFERRED EMBODIMENT

As shown in FIG. 1, a telephone pole 8 with wires 6 extending therefrom to the roof 5 of a residential or commercial dwelling/structure is shown here. If nothing were done, rats and other rodents could walk along the utility wires which extend from the poles 8 to the roof 5, or gain access to utility wires 6 which run through trees to access a roof 5 of a residential or commercial structures.

The present invention as shown in FIG. 1, an aerial barrier plate 7, between the residential or commercial structure roof 5 and the telephone pole 8, provides a barrier around which rats and other rodents cannot pass.

The aerial rat/rodent guard in FIG. 2, shows a rat/rodent guard which may be many sizes but high enough above the center slot 9 as to make it impossible for the rat to see over, jump or push over. The barrier plate is preferred to be approximately 8 inches from the center slot 9 upwards and in circumference to center slot 9 and encompassing the basic shape, with smooth slick surface and manufactured from light-weight materials. FIG. 3.

The aerial rat/rodent guard of this invention may be made in many shapes and sizes, but it is preferably comprised of an aerial barrier plate of a tear drop shape 7 as shown in the drawings with smooth surfaces and edges. The barrier plate center of gravity is above the center of the barrier plate 15, extending to a "V" shaped bottom 14 which holds weight which weight maintains an upright posture which is impossible for the rat to push over and from the utility wires and cables 6 and a rat/rodent cannot gain any stability, as shown in FIG. 3. If the rat should attempt to climb the rat guard he will most likely slide off the plate barrier and fall off the wire due to the instability and the barrier plate's resistance from the bottom weight 14 and by the barrier plate's surface, shape and ability to move, tip and swing from side to side and become unmanageable if tampered by the rat or rodent.

The center grommet 13 loosely encircles the wires as seen in FIG. 4 and is used to adjust the size of the center slot 9 to make it smaller and also prevents the wires from fraying and keeps the barrier plate from creeping either up or down the wires or cables 6 due to sloping uphill or downhill or by the wind.

Installation is one-time achieved without the use of tools by opening the slit 10 as shown in FIG. 4, sliding the wire 6 up to the center slot 9, as shown in FIG. 4, and the slit closes to the bottom where added weight has been molded into the bottom 14 of the aerial rat/rodent guard as shown in FIG. 4; and tail clip 11 and streamers 12 attached to the bottom of the barrier plate as shown in FIG. 4 locks the slit closed. The streamers 12 are for residential aesthetic configuration in addition to art work and plain opaque colors for commercial environments.

Once installed on the utility wires and cables 6, approximately 5–6 feet from the edge of the roof of the structure as show in FIG. 1, the aerial rat/rodent guard does not need to be removed.

I claim:

1. An aerial rat guard for residential and commercial utility wires and cables, including in combination:
    a barrier plate which egg shaped vertex gradually tapers from a center slot downward to an oblique shaped bottom which surface is slightly convexo-concaved and contains a smooth/slick, light weight, electrically non-conductive material wherein the center slot is located slightly above the center of gravity to maintain an upright position when mounted upon wires and cables; including in combination:
        a vertical center slit extending from the bottom upwards to said center slot for installation;
        a replaceable center slot grommet to adjust to various thickness of wires and cables to which they run through to loosely encircle said wires and cables to allow tipping and swinging movement;
        a weighted tail section which gives said barrier plate the unstable characteristics of tipping and swinging from side to side on the wires and cables if tampered by a rat/rodent; and
        wherein said grommet further comprises rounded edges thereby enabling the guard to not creep up or down the wires and cables nor fray the wires and cables.

2. A rat guard according to claim 1 wherein said vertical center slit opens at the bottom of the barrier plate thereby allowing the wires and cables to slide from the bottom up to the center slot for simple one-time installation without the use of tools.

3. A rat guard according to claim 1 wherein said grommet further comprises a slit for installation into the center slot.

4. A rat guard according to claim 1 having a tail clip with streamers attached to the clip which secures the vertical center slit closed.

5. A rat guard according to claim 1 constructed of electrically non-conductive recyclable materials.

6. An aerial rat guard for commercial and residential utility wires and cables, including in combination:
    a light weight tear drop shaped, convexo-concaved smooth surfaced, electrically non-conductive barrier plate having a center slot above center of gravity and a vertical center slit from a bottom up of the barrier plate to the center slot;
    said vertical center slit affords easy installation on the utility wires and cables;
    a replaceable center slot grommet to adjust to various thickness of utility wires and cables to which said grommet encircles;
    a weighted tail section which keeps said barrier plate in an upright position giving resistance to tampering and said barrier plate having an unstable characteristic of tipping and swinging from side to side on the utility wires and cables if tampered with by a rat/rodent; and
    wherein said grommet further comprises rounded edges thereby enabling the guard to not creep up or down the utility wires and cables nor fray the utility wires and cables.

7. A rat guard according to claim 6 wherein said vertical center slit opens at the bottom of the barrier plate thereby allowing the utility wires and cables to slide from the bottom up to the center slot for simple one-time installation without the use of tools.

8. A rat guard according to claim 6 wherein said grommet further comprises a slit for installation into the center slot.

9. A rat guard according to claim 6 having a tail clip to secure the vertical center slit closed.

10. An aerial rat guard for commercial and residential utility wires and cables, including in combination:
    a tear drop shaped smooth surfaced, light weight, electrically non-conductive barrier plate having a center slot slightly above the center of gravity;
    a center slit extending from a bottom of said barrier plate upwards to said center slot;
    a replaceable center slot grommet to adjust to various thickness of wires and cables which run through said grommet thereby securing a proper fit on the wires and cables;
    a weighted tail section which keeps said barrier plate in an upright position giving said barrier plate an unstable characteristics of tipping and swinging from side to side on the wires and cables if tampered with by a rat/rodent;
    a tail clip with streamers attached to the clip; and wherein said grommet further comprises rounded edges thereby enabling the guard to not creep up or down the wires and cables nor fray the wires and cables.

11. A rat guard according to claim 10 wherein said vertical center slit opens at the bottom of said barrier plate allowing the wires and cables slide from the bottom up to the center slot for simple one-time installation without the use of tools.

12. A rat guard according to claim 10 wherein said barrier plate is aesthetically configured with predator or other designs on the barrier plate for residential use.

13. A rat guard according to claim 10 wherein said grommet further comprises a slit for installation into the center slot.

14. A rat guard according to claim 10 wherein said tail clip secures the vertical center slit closed.

15. A rat guard according to claim 10 constructed of electrically non-conductive recyclable materials.

* * * * *